Sept. 8, 1964   G. H. BINGHAM, JR   3,147,559
MACHINE-MADE PLATFORM-STYLE SHOE
Original Filed Aug. 30, 1960                    4 Sheets—Sheet 1

INVENTOR.
GEORGE H. BINGHAM JR.
BY
ATTORNEYS

Sept. 8, 1964   G. H. BINGHAM, JR   3,147,559
MACHINE-MADE PLATFORM-STYLE SHOE
Original Filed Aug. 30, 1960   4 Sheets-Sheet 2

INVENTOR.
GEORGE H. BINGHAM JR.
BY
Roberts Cushman & Grover
ATTORNEYS

Sept. 8, 1964   G. H. BINGHAM, JR   3,147,559
MACHINE-MADE PLATFORM-STYLE SHOE
Original Filed Aug. 30, 1960   4 Sheets-Sheet 3

INVENTOR.
GEORGE H. BINGHAM JR.
BY
ATTORNEYS

Sept. 8, 1964   G. H. BINGHAM, JR   3,147,559
MACHINE-MADE PLATFORM-STYLE SHOE
Original Filed Aug. 30, 1960   4 Sheets-Sheet 4

INVENTOR.
GEORGE H. BINGHAM, JR.
BY
ATTORNEYS

United States Patent Office 3,147,559
Patented Sept. 8, 1964

3,147,559
MACHINE-MADE PLATFORM-STYLE SHOE
George H. Bingham, Jr., Westminster, Md., assignor to Cambridge Rubber Company, Taneytown, Md., a corporation of Maryland
Original application Aug. 30, 1960, Ser. No. 52,899, now Patent No. 3,047,890, dated Aug. 7, 1962. Divided and this application June 5, 1962, Ser. No. 200,270
8 Claims. (Cl. 36—14)

This invention pertains to footwear, in particular to footware of the casual type, usually having an upper of textile fabric with or without other material, for instance, leather, and a thick but pliable outer sole, for example, one of felt or a rubber compound or other elastomer. This is a division of my application Serial No. 52,899, filed August 30, 1960, which issued as Patent No. 3,047,890 on August 7, 1962.

Such footwear includes shoes of the so-called "platform type" wherein the thick sole may comprise a plurality of superposed layers, each having an elastically yieldable core, for example, a layer of felt, and a marginal binding of thin leather, textile fabric or other material providing a binding for the core layer and which is usually designed to impart an ornamental effect, as by color or texture, and which usually provides an edge which is convexly rounded. On the other hand, in the manufacture of the more common type of casual shoe, the thick outer sole is a single layer of rubber compound or the like which is usually die-cut from a sheet of the material so that thus, the outer sole has a straight or vertical edge fully exposed to view. In most cases this edge is not ornamental as respects either texture or color.

While some attempts have been made to impart an ornamental appearance to the edge of such a sole so as more closely to simulate the true platform sole, as, for example, by adhesively bonding, to the edge of the rubber sole, a ply of thin cloth or other fabric material, this practice has not been widely adopted because of the difficulty of providing a permanent bond between the covering material and the material of the sole itself, so that the flexing of the sole during wear soon loosens the fabric, resulting in a ragged appearance which is anything but ornamental.

The present invention has for an object the provision of a shoe of the casual type (wherein the outer sole consists of a unitary mass of rubber die-cut from a sheet of the same material) but wherein the exposed edge of the outer sole, in the completed shoe, has an ornamental texture and/or color, for example resulting from the permanent and secure bonding of textile fabric or other pervious material to the edge of the sole proper. A further object is to provide footwear of the above description wherein the edge of the sole may have a contour similar to that which is commonly found in platform shoes; that is to say, an edge which is convexly curved and with the core element of the sole concealed, and also to provide a shoe having a sole having a portion, at least, of its outer edge permanently covered by a ribbon of textile fabric material which is pervious to the material of the outer sole and wherein the exposed margin of the upper surface of the sole has indentations suggestive of the stitches in the welt of a Goodyear welt shoe. A further object is to provide an outer sole, ready for application to the bottom of a lasted upper, in accordance with a customary practice, but wherein the peripheral edge of the outer sole, that is to say, that edge surface of the outer sole which extends from the upper face of the outer sole to its tread surface, has permanently bonded thereto and, if desired, embedded therein, material of an ornamental character. Other and further objects and advantages of the invention will be pointed out in the following more detailed description, and by reference to the accompanying drawings wherein:

Figure 1:
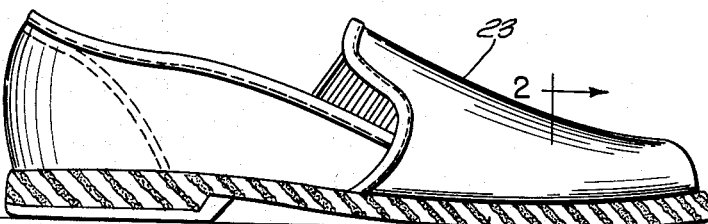
FIG. 1 is a diagrammatic side elevation of a casual shoe having a thick outer sole of rubber or the like, but with the edge of the outer sole concealed by a layer of covering material, and wherein the edge is convexly curved to resemble the sole of a platform shoe.
Figure 4:
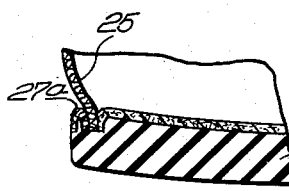
FIG. 4 is a fragmentary diagrammatic section on line 4—4 of FIG. 3, showing how the upper margin of the burlap extends inwardly over the margin of the sole proper to contact the lower edge of the shoe upper.
Figure 2:
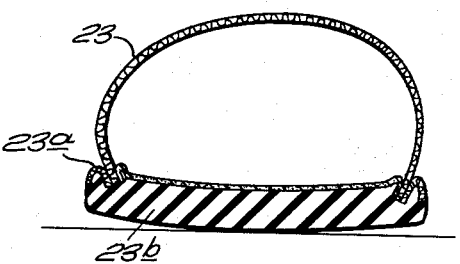
FIG. 2 is a section on the line 2—2 of FIG. 1.
Figure 17:
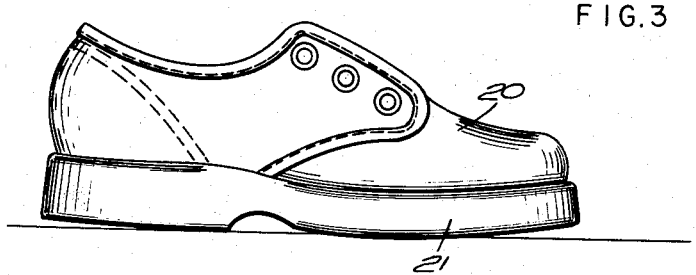
Figure 6:
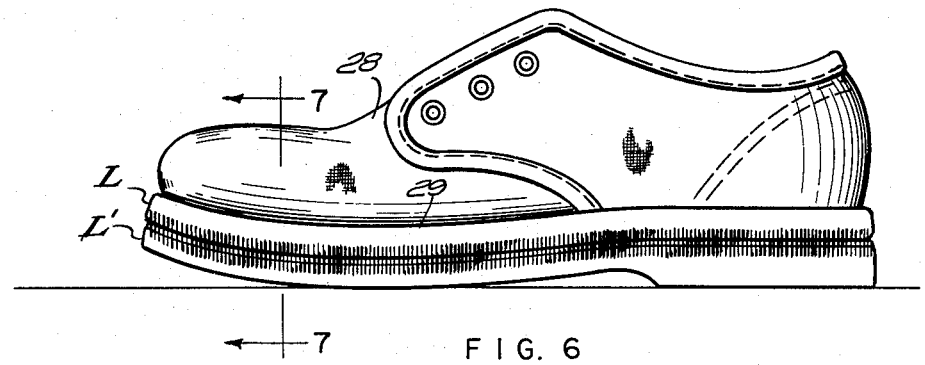
FIG. 6 is a side elevation of a casual shoe similar to that of FIG. 1, but wherein the edge of the outer sole is concealed by an adhering ply of textile fabric and wherein the edge of the outer sole is indented approximately midway its height so as to form two superposed lobes closely approximating in appearance a double layer platform sole.
Figure 9:
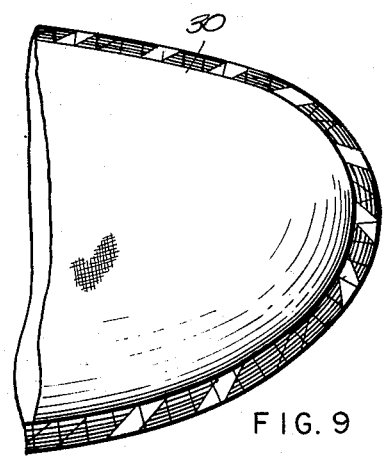
Figure 8:
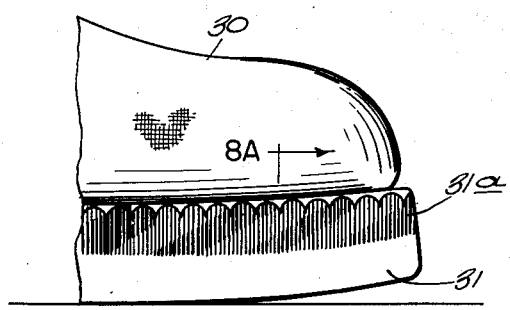
Figure 8A:
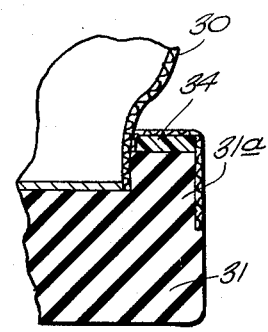
Figure 10:
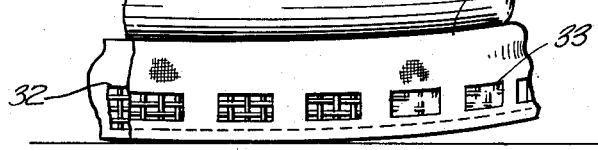
Figure 11:
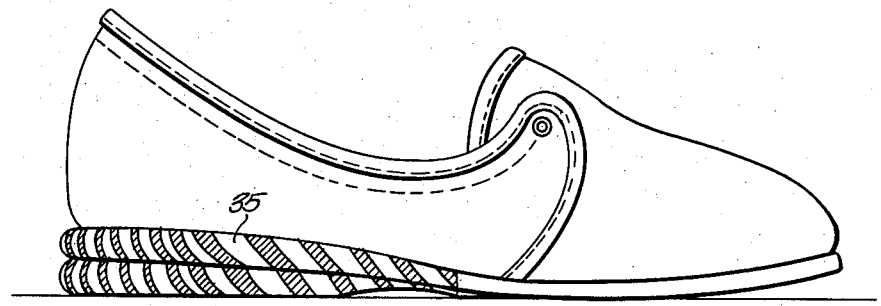
Figure 13:
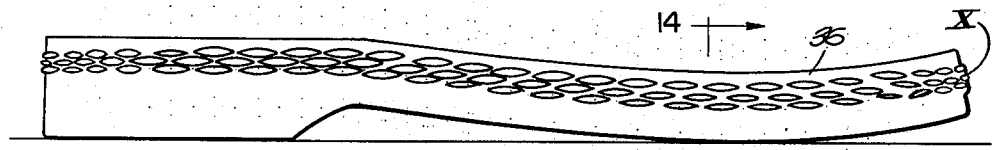
Figure 14:
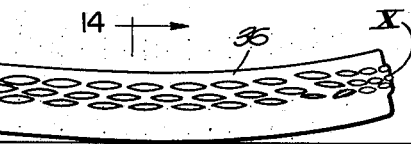
Figure 15:
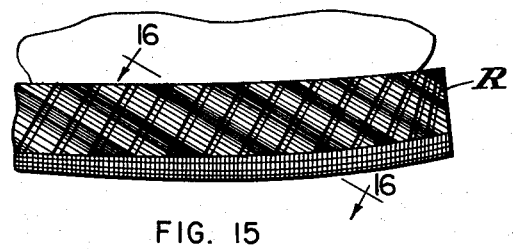
Figure 16:
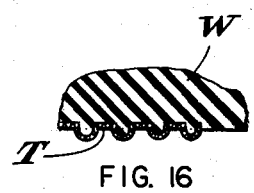
Figure 12:
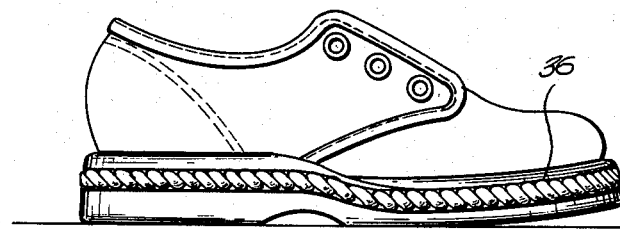
Figure 18:
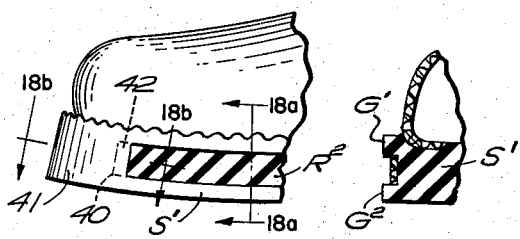
Figure 18A:
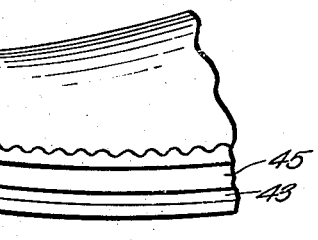
Figure 19:
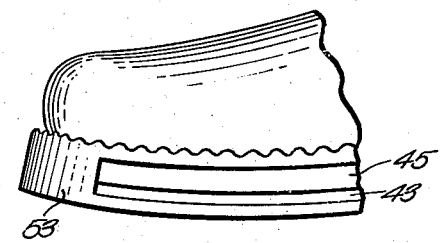
Figure 20:
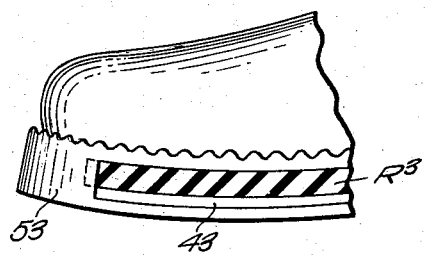
Figure 21:
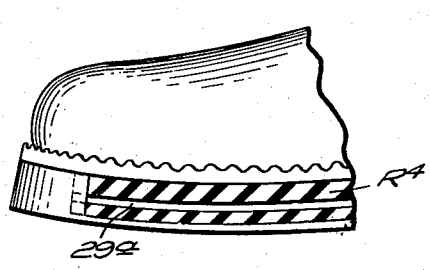
Figure 18B:
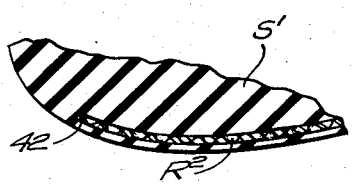
Figure 22:
Figure 23:
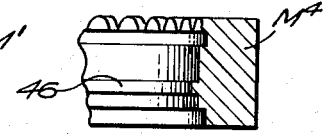
Figure 26A:
Figure 24:
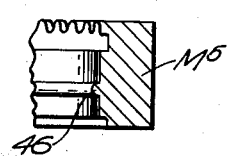
Figure 26:
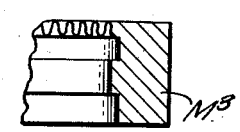
Figure 25:
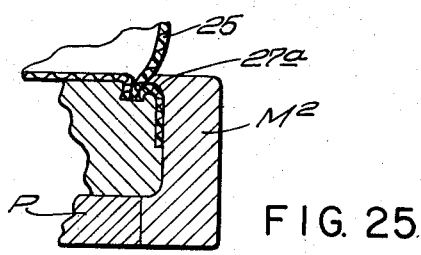

FIG. 8 is a fragmentary elevation showing the forward part of a casual shoe having a unitary outer sole but wherein the upper edge of the outer sole has been indented to form a series of ribs resembling the welt of a welt shoe and wherein the upper half of the outer sole is concealed by a layer of textile fabric which overlaps the indented margin of the outer sole and which has been integrally bonded to the material of the outer sole while the indentations are being formed;

FIG. 8a is a fragmentary vertical section substantially on the line 8a—8a of FIG. 8, showing how the outer sole has been provided with a narrow strip of plastic on its upper margin prior to the application of the textile material;

FIG. 9 is a fragmentary plan view of the parts shown in FIG. 8;

FIG. 10 shows another arrangement wherein the edge of the outer sole has first been covered with a layer of burlap and then a ply of thin, close woven textile material has been placed over the burlap, the thin material having perforations through which the burlap, which may be of contrasting color, may be seen;

FIG. 11 is a view generally similar to FIG. 1, but showing the rear portion of the outer sole as having been indented longitudinally like the outer sole of FIG. 6, thus providing a close simulation of certain types of platform shoes;

FIG. 12 is a side elevation of a casual shoe having an outer sole wherein a strip of textile material, for example, burlap, a coarse braid or piece of rope, has been embedded in the outer edge of the outer sole so that it is flush with the uncovered material of said edge;

FIG. 13 is a side elevation of an outer sole, for example, a unitary mass of cured rubber compound, ready for application to the bottom of a lasted upper, but having embedded in its peripheral edge a strip of textile fabric or other material of a contrasting color or texture;

FIG. 14 is a transverse section on the line 14—14 of FIG. 13;

FIG. 15 is a fragmentary side elevation of an outer sole comprising a unitary mass of rubber having the upper portion of its edge covered with textile or other material which has been indented into the rubber by diagonally extending elongate indentations;

FIG. 16 is a fragmentary section on line 16—16 of FIG. 15;

FIG. 17 is a side elevation of a casual shoe of the usual type having a thick, die-cut outer sole;

FIG. 18 is a fragmentary side elevation illustrating a casual shoe having a thick outer sole of elastomeric material whose edge, except at the ends of the shoe has ornamental material embedded therein, and with the margin of the upper surface of the outer sole indented to simulate a welt;

FIG. 18a is a fragmentary vertical section on the line 18a—18a of FIG. 18;

FIG. 18b is a fragmentary horizontal section on line 18b—18b of FIG. 18;

FIG. 19 is a view similar to FIG. 18, showing the shoe as it would appear were the ornamental material of FIG. 18 omitted;

FIG. 20 is a view generally similar to FIG. 18, but showing ornamental material differentially arranged;

FIG. 21 is a view generally similar to FIG. 18, but showing the ornamental material as having a longitudinal indentation between its upper and lower edges;

FIG. 22 is a fragmentary vertical section showing a ring mold of a type useful in making a shoe like that of FIGS. 1 and 2;

FIG. 23 is a view similar to FIG. 22, but showing a ring mold useful in making a shoe such as that of FIG. 20;

FIG. 24 is a view similar to FIG. 22, but showing a ring mold such as would be useful in making a shoe like that of FIG. 21;

FIG. 25 is a section showing a ring mold useful in making a shoe like that of FIG. 4, and showing shoe material within the mold;

FIG. 26 is a view similar to FIG. 22, but showing a ring mold useful in making a shoe like that of FIG. 18; and FIG. 26a is a fragmentary horizontal section through the ring mold of FIG. 26.

Referring to FIG. 17, the numeral 20 designates the upper of a conventional shoe of the casual type and the numeral 21 indicates a thick outer sole of rubber compound or the like. Such soles are commonly die-cut from sheet material and thus the edge of the sole is substantially vertical. At this edge, the material of the sole is exposed and usually no attempt is made to conceal the material or to impart an ornamental appearance.

In FIG. 1, wherein a shoe embodying the present invention is illustrated, the shoe is also of the casual type, having the upper 23, but in this instance, the major portion of the peripheral edge of the thick outer sole of rubber or other elastomeric material is concealed by covering material 23a (FIG. 2), for example, coarse textile fabric. This fabric is applied to the edge of the outer sole blank as a ribbon-like strip while the outer sole blank is in uncured or partially cured condition. Desirably, adhesive is interposed between the ribbon and the outer sole blank so as temporarily to hold the parts in assembled relation preparatory to the attachment of the outer sole blank to the upper. The assembled sole blank and ribbon are placed in the mold of the machine whereby the outer sole blank and lasted upper are united, but in this instance, the ring mold $M^1$ is so shaped (FIG. 22), as to cause the edge of the outer sole blank to become outwardly convex or rounded. This rounding of the edge of the outer sole blank causes the upper margin of the ribbon to be embedded, together with the lower margin of the upper 23 in the material 23b of the outer sole. Moreover, the pressure to which the parts are applied is such as to cause some of the rubber of the outer sole blank to impregnate the fabric of the ribbon and thus a permanent bond is provided such that the ribbon will remain in place throughout the life of the shoe. In part, because of the rounding of the edge of the sole blank, and in part, because of the textile material which conceals the rubber sole, the resultant sole has much the appearance of that of the handmade sole of a shoe of the platform type.

Figure 3:
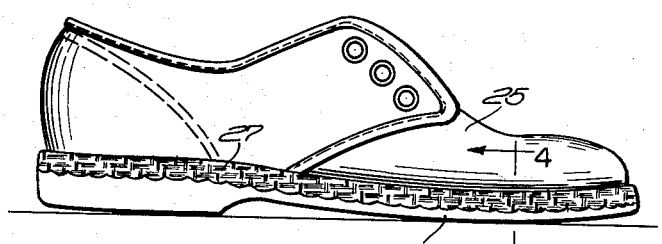
FIG. 3 is a view similar to FIG. 1, but showing the outer sole as having a substantially vertical edge, but with the upper portion of said edge covered and concealed by a layer of open mesh textile fabric, for example, burlap which is securely held in place by the material of the sole itself which has penetrated the burlap.

In FIG. 3 the shoe illustrated comprises the upper 25 and the outer sole 26, with a ribbon 27 of coarse mesh textile fabric, for example, a flat braid, covering and concealing the upper portion of the peripheral edge of the sole while leaving the lower portion of the edge exposed for contrast. The ribbon is assembled with the outer sole blank in the same way as above suggested, and a ring mold $M^3$, like that of FIG. 26, may be employed. As the result of the pressure and heat applied for bonding the sole blank and upper, the material of the sole blank penetrates the meshes of the fabric, providing a secure and permanent bond. As shown in FIG. 4, the upper margin 27a of the fabric overlies the margin of the upper surface of the outer sole with the extreme edge of the fabric contacting the shoe upper. In this shoe the outer surface of the ribbon is substantially flush with the exposed surface of the outer sole, and the meshes of the ribbon are completely filled with the elastomeric material.

Figure 7:
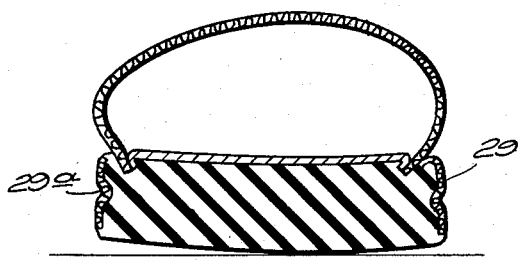
FIG. 7 is a diagrammatic section on line 7—7 of FIG. 6.

In the arrangement illustrated in FIGS. 6 and 7, the shoe upper is shown at 28 and a strip 29 of textile fabric is shown as concealing the mid-portion of the edge of the outer sole. After this textile material, in the form of a ribbon, has been assembled with the outer sole blank, the assembly is placed in a mold, wherein the ring member is so shaped as to form a shallow channel in the ribbon and the edge of the sole blank along a longitudinally extending groove 29a (FIG. 7), approximately midway between the upper and lower surfaces of the sole blank, while causing the portions of the sole, above and below the groove, to become convex. This results in forming longitudinally extending superposed lobes L, $L^1$ (FIG. 6), each having an outwardly convex surface and each including a partial covering, at least, of textile material. The result is a shoe which closely resembles one having a platform sole. The formation of the indentation results in a high unit pressure at the bottom of the groove which forces the material of the sole into the structure of the ribbon and thus insures an integral bond between the ribbon and the material of the outer sole.

In FIG. 8 is illustrated a portion of a shoe having the upper 30 and the outer sole 31, and having a ribbon 31a of textile material which conceals the upper portion of the peripheral edge of the outer sole, leaving the lower part uncovered. The upper margin of the ribbon overlaps the margin of the upper surface of the outer sole and this upper margin of the ribbon is indented into the material of the outer sole blank, by the use of a ring mold having a toothed upper edge, as shown in FIGS. 23, 24 and 26, thus providing a secure anchorage of the ribbon because, since, in forming the indentations, the ribbon is forced downwardly into the substance of the outer sole blank. The result is to simulate the welt of a welt shoe. As noted, the indentation of the ribbon results in a very secure bonding of the ribbon to the outer sole while incidentally producing an ornamental effect.

The arrangement of FIG. 8a is generally similar to that of FIG. 8 except that a narrow band 34 of plastic material is applied to the margin of the upper surface of the outer sole blank, before the covering ribbon is applied. If such band 34 be of a color contrasting with that of the outer sole material and ribbon its penetration into the meshes of the fabric, during the indentation of the latter, gives the appearance of a welt strip of a material different from that of the fabric covering.

The sole of the shoe shown in FIG. 10 has a strip 32 of burlap applied to the peripheral edge of the outer sole and over this burlap is arranged a ribbon 32a of thin, closely woven textile material. As shown, this ribbon 32a has perforations 33 through which the underlying burlap may be seen. The coarse-mesh burlap becomes firmly bonded to the material of the outer sole by the action of the mold and the textile ribbon 32a may readily be adhered to the burlap (also textile) by the use of an interposed adhesive of conventional type, although ordinarily enough of the material of the sole may exude from the outer face of the burlap to bond the ribbon to the burlap without interposed adhesive. In any event, some of the material of the sole will be forced outwardly into the perforations of the ribbon 32a, thus assisting in providing a secure anchorage for the latter ribbon, and if the burlap be of a color contrasting with that of the outer ribbon, this color will be visible through the perforations, thus providing an ornamental appearance.

In FIG. 11 a shoe is shown wherein the edge of the outer sole has been covered with a textile ribbon 35 about its heel portion and forwardly along the shank but is omitted at the forepart. Where this material conceals the sole edge, it is indented, similarly to that of FIGS. 6 and 7, so that, as a result, the shoe closely resembles one having a handmade platform, while at the same time the ribbon is firmly united to the outer sole.

In FIG. 12 a shoe is illustrated, wherein the edge of the outer sole has embedded therein, between its upper and lower parts, an ornamental strip or ribbon 36, for example, of very coarse fabric, for example, a textile braid, or a flat rope, so embedded in the material of the outer sole that it is flush with the exposed surfaces of the sole edge above and below it while its interstices are filled with the sole material.

In the shoe of FIG. 18, the ornamental ribbon R² is sunken in the edge of the sole S¹, so that the upper and lower margins G¹ and G² (FIG. 18a) of the sole edge protrude beyond the outer surface of the ribbon, thus helping to protect the ribbon from abrasion. However, in this shoe, the ribbon extends along the sides, only, of the shoe, terminating as shown, for example, at 40 (FIG. 18), rearwardly of the end of the shoe, so that at the end (toe and preferably the heel), the edge 41 of the sole material itself is exposed for its full depth, this being the point where exposure to wear is greatest. Preferably, at its terminal end, the ribbon is completely embedded in the material of the sole S¹, as indicated at 42 (FIGS. 18 and 18b), as by the use of the ring mold M³ (FIGS. 26 and 26a). Thus the ribbon is solidly anchored to the sole material.

The shoe of FIG. 20 is generally similar to that of FIG. 18, except that below the lower edge of the ribbon R³ the edge of the sole 53 has a groove 43 of a depth greater than the thickness of the ribbon. This groove provides added ornamental effect and may, if desired, receive coloring or other material contrasting with the ribbon. Such a sole edge may be formed by the use of a ring mold M⁴, such as illustrated in FIG. 23 (which in horizontal section at its end may be like the ring mold M³, as illustrated in FIG. 26a).

Such a ring mold M⁴, if employed without first having applied the ribbon R³ to the edge of the sole blank, would produce a sole edge such as illustrated in FIG. 19, having an empty channel 45 and groove 43 which could, of course, if desired, receive coloring or other material during the process of completing the shoe.

The shoe of FIG. 21 is generally like that of FIG. 18, but the ribbon R⁴ which ornaments its edge is indented intermediate its upper and lower edges and by the use of the ring mold M⁵ (FIG. 24) having a narrow rib 46, which forces the ribbon inwardly during the molding process. Embedding of the ribbon by the action of this rib assists in providing a permanent anchorage of the ribbon to the material of the sole and also imparts a further ornamental appearance to the sole edge.

Figure 5:
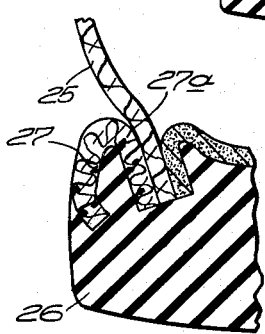
FIG. 5 is a fragmentary section similar to FIG. 4, but to much larger scale.

In FIG. 22, there is shown, in section, a ring mold M¹ such as would be useful in making a shoe of the type illustrated in FIGS. 1 and 2; while in FIG. 25 there is illustrated a mold comprising the bottom plate P and ring M² useful in making a shoe like that of FIGS. 4 and 5.

While as above described, the textile ribbon or other ornamental material is conveniently united to the sole as a concomitant to the bonding of the sole and upper of the shoe, it is within the scope of the invention to attach the ribbon to the outer sole before the latter is assembled with the lasted upper. This may be desirable when the shoe is made according to some processes which involve the complete or nearly complete curing of the outer sole before it is attached to the upper. Thus, in FIGS. 13 and 14 a molded outer sole 36 is shown as having embedded in its edge a strip of textile fabric X which was assembled with the uncured sole blank and pressed into the latter during the curing operation. A sole thus prepared may be applied to the lasted upper according to customary procedure and the completed shoe will have the same general apperance as one which results from the above-described practice wherein the ribbon of textile material is united to the sole while the latter is being bonded to the upper.

In FIGS. 15 and 16 a sole like that of FIG. 8 is illustrated, but in which the covering ribbon R of textile fabric covers the upper portion of the edge of the sole W, and wherein the material of the sole and the ribbon have been provided with indentations T (FIG. 16) which extend diagonally and transversely of the sole edge. The forming of such indentations serves to provide an intimate contact between the ribbon and the material of the sole. Obviously, indentations otherwise arranged than as above specifically described may be provided, primarily to insure bonding of the ribbon to the sole, although also affording a means of obtaining an ornamental effect.

While certain desirable embodiments of the invention have herein been described and illustrated, it is to be understood that the invention is broadly inclusive of any and all modifications falling within the scope of the appended claims.

I claim:

1. A shoe having an upper and an outer sole, the outer sole, at least, being of elastomeric material, a coarse-mesh textile ribbon extending along the peripheral edge of the outer sole, that is to say, that edge surface of the outer sole which extends from the upper face of the outer sole to its tread surface, the major portion, at least, of the width of said ribbon being below the junction of said peripheral edge with the upper face of the outer sole; in face-to-face contact with the outer edge of the outer sole; and being permanently bonded to the outer sole proper by completely cured portions of the outer sole material which permeate the ribbon, the ribbon thereby concealing that portion of said peripheral edge of the outer sole with which it is in contact and thus imparting an ornamental effect to said edge.

2. A shoe according to claim 1, wherein the ribbon is of lesser width than the thickness of the outer sole and is so embedded in the material of the outer sole that the outer surface of the ribbon is flush with the exposed edge surface of the outer sole.

3. A shoe according to claim 1, wherein the ribbon which extends peripherally about the edge of the outer sole is of a coarse mesh similar to that of burlap, having its meshes filled with outer sole material.

4. A shoe according to claim 1, wherein the textile ribbon is a braid which is embedded in the substance of the outer sole, although externally visible.

5. A shoe according to claim 1, wherein a length of ribbon extends along each side of the shoe but terminates rearwardly of the extreme toe end of the shoe, the forward end of each length of ribbon being completely overlaid and concealed by material of the outer sole proper.

6. A shoe according to claim 1, wherein the ribbon is of coarse-mesh woven fabric and a second ribbon of finer weave is adherent to the outer surface of the first ribbon, the second ribbon having perforations therethrough, portions of the outer sole material passing through the mesh of the coarse-woven fabric and entering the perforations of the finer-woven fabric whereby both ribbons are bonded to the outer sole proper.

7. A shoe according to claim 1, wherein the outer surface of the ribbon is convexly curved at any vertical section.

8. In combination in a shoe having an upper and an outer sole, the latter being of elastomeric material, a ribbon of coarse mesh textile material extending along the peripheral edge of the outer sole, that is to say, that edge surface of the outer sole which extends from the upper face of the outer sole of its tread surface, said ribbon being sunken into said edge, and a portion of the outer sole protruding outwardly beyond the outer surface of the ribbon thereby protecting the latter from abrasion, the ribbon being permanently bonded to the sole proper by intrusions of the sole material into the meshes of the ribbon.

References Cited in the file of this patent

UNITED STATES PATENTS

| | | |
|---|---|---|
| 2,019,544 | Riddock | Nov. 5, 1935 |
| 2,071,298 | Dunbar | Feb. 16, 1937 |
| 2,074,579 | Fesl | Mar. 23, 1937 |
| 2,129,106 | Szerenyi et al. | Sept. 6, 1938 |
| 2,210,753 | Field | Aug. 6, 1940 |
| 2,276,686 | Chevalier | Mar. 17, 1942 |
| 2,499,751 | Hoza | Mar. 7, 1950 |
| 2,990,626 | Bowen | July 4, 1961 |
| 3,070,909 | Binder et al. | Jan. 1, 1963 |

FOREIGN PATENTS

| | | |
|---|---|---|
| 702,914 | Great Britain | Jan. 27, 1954 |